Feb. 2, 1937.　　　　R. M. WOYTYCH　　　2,069,296
MACHINE TOOL AND METHOD
Filed May 8, 1933　　　3 Sheets-Sheet 1

Inventor
Raymond M. Woytych
By Chindahl, Parker & Carbon
Attorneys

Feb. 2, 1937.  R. M. WOYTYCH  2,069,296
MACHINE TOOL AND METHOD
Filed May 8, 1933   3 Sheets-Sheet 2
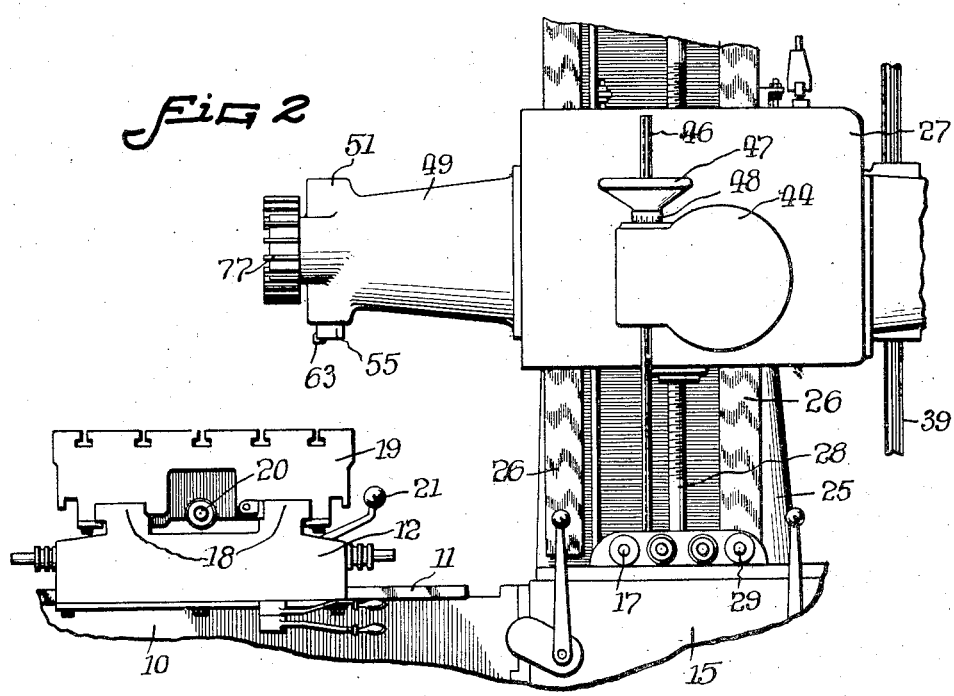
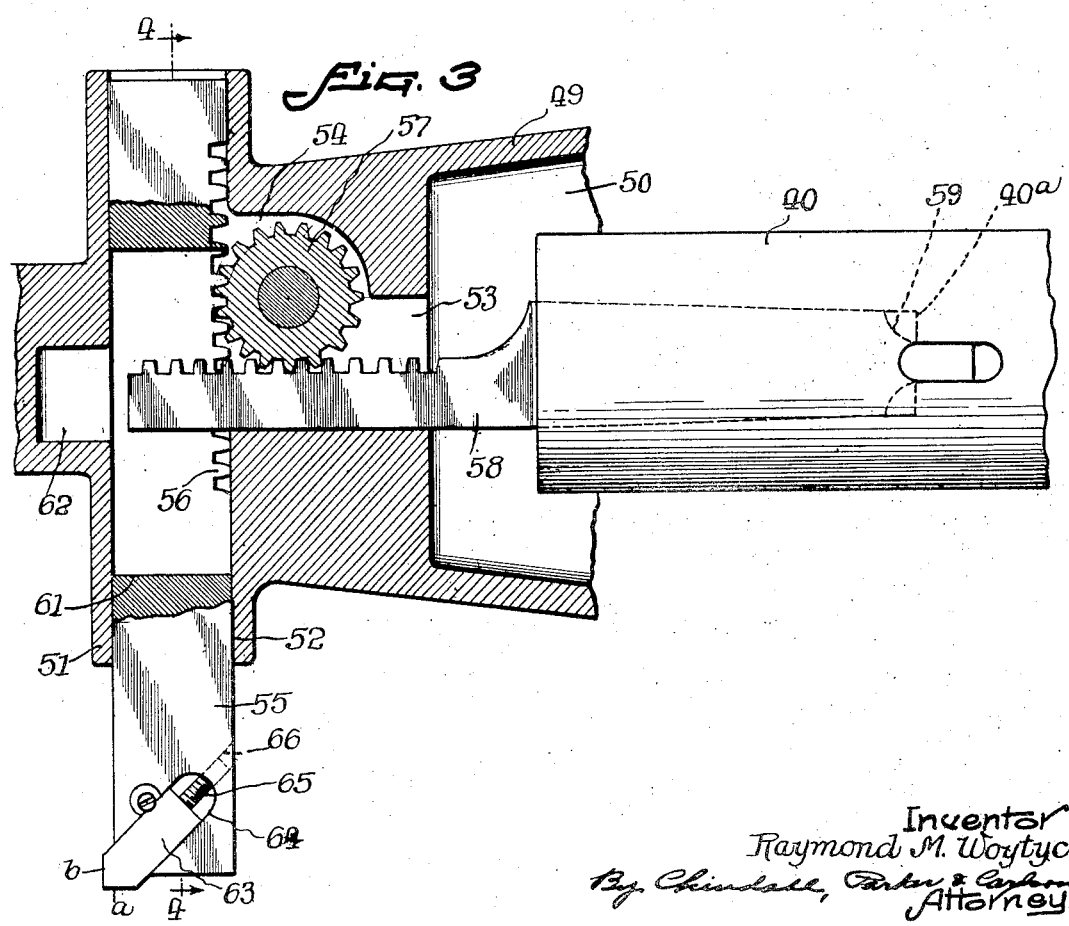
Inventor
Raymond M. Woytych,
By Chindall, Parker & Carlson
Attorneys Feb. 2, 1937.  R. M. WOYTYCH  2,069,296
MACHINE TOOL AND METHOD
Filed May 8, 1933  3 Sheets-Sheet 3
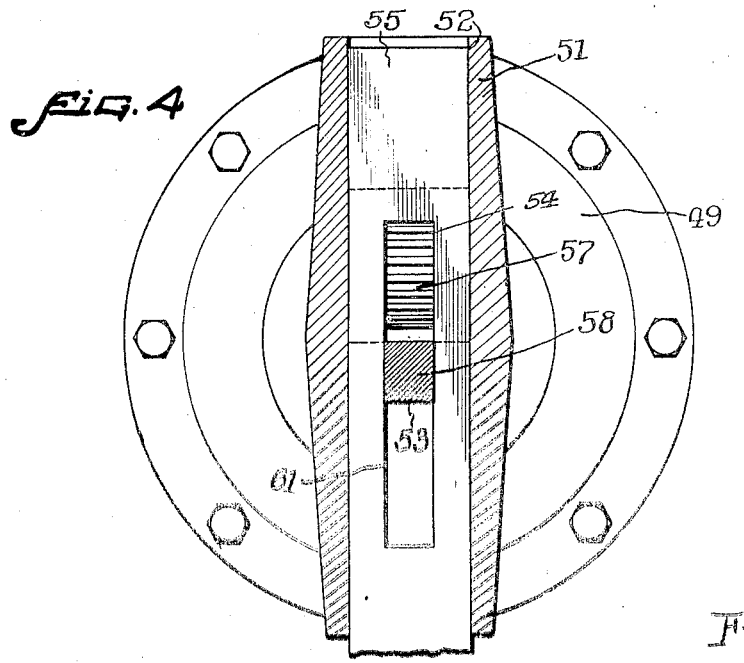
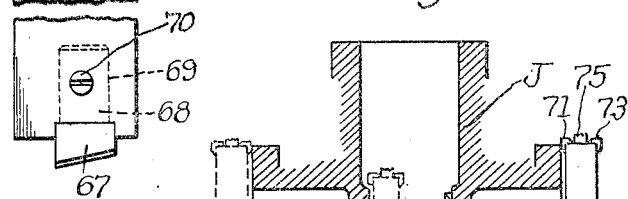
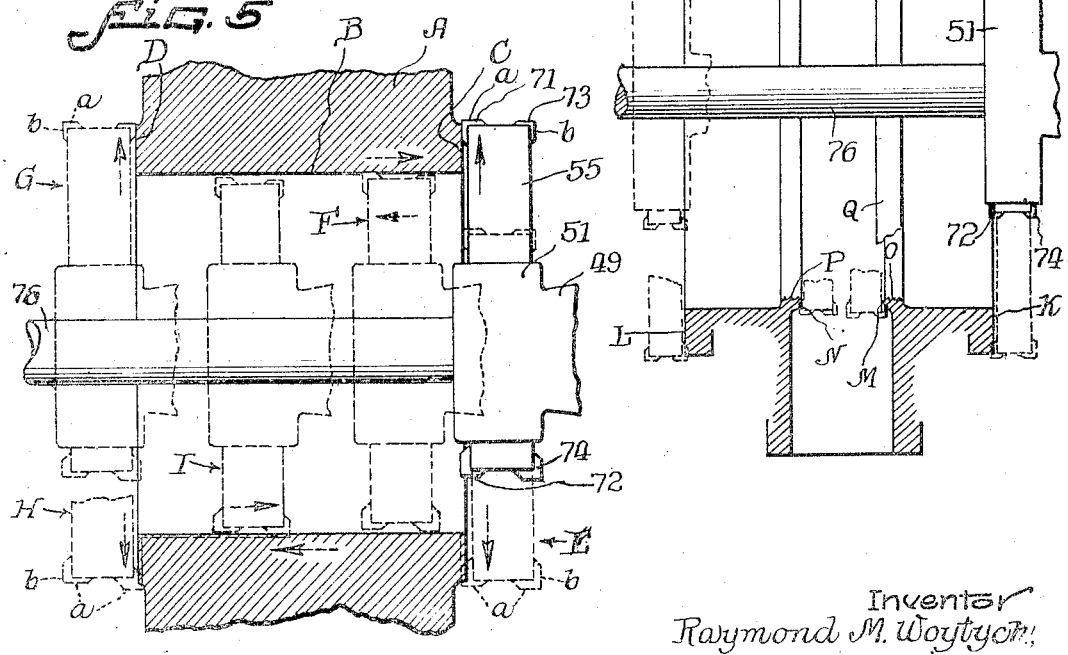
Inventor
Raymond M. Woytych
By Chindahl, Parker & Carlson
Attorneys Patented Feb. 2, 1937

2,069,296

UNITED STATES PATENT OFFICE 2,069,296

MACHINE TOOL AND METHOD

Raymond M. Woytych, Fond du Lac, Wis., assignor to Giddings & Lewis Machine Tool Co., Fond du Lac, Wis., a corporation of Wisconsin Application May 8, 1933, Serial No. 669,846

25 Claims. (Cl. 29—26)

The present invention relates to improvements in machine tools, and has particular reference to a new and improved attachment adapted for horizontal boring, drilling and milling machines.

The primary object of the present invention resides in the provision of a new and improved attachment which is adapted to be driven from a tool headstock, and which may be provided with one or more tools adjustable to perform a wide and flexible range of machine operations.

A more specific object resides in the provision of a novel attachment of the foregoing character having a plurality of tools adapted to be utilized to perform a sequence of operations without removing any tools or attaching other tools.

Another object resides in the provision of a novel method of machining a work blank by successive operations on one or a plurality of surfaces in one setting up of the blank.

Further objects and advantages will become apparent as the description proceeds.

In the accompanying drawings, Figure 1 is a front elevational view of a horizontal boring, drilling and milling machine with an attachment embodying the features of my invention.

Fig. 2 is a fragmentary front elevational view of a modified form of the invention.

Fig. 3 is an enlarged fragmentary view, partially in section, of the attachment shown in Fig. 1.

Fig. 4 is a transverse sectional view taken along line 4—4 of Fig. 3, but showing the attachment with a different cutting tool.

Fig. 5 is a fragmentary view illustrating the use of the attachment with a plurality of tools for taking roughing and finishing cuts on the end faces and bore of a work blank.

Fig. 6 is a view similar to Fig. 5 but showing the attachment adapted for machining another type of work blank.

Figure 1:
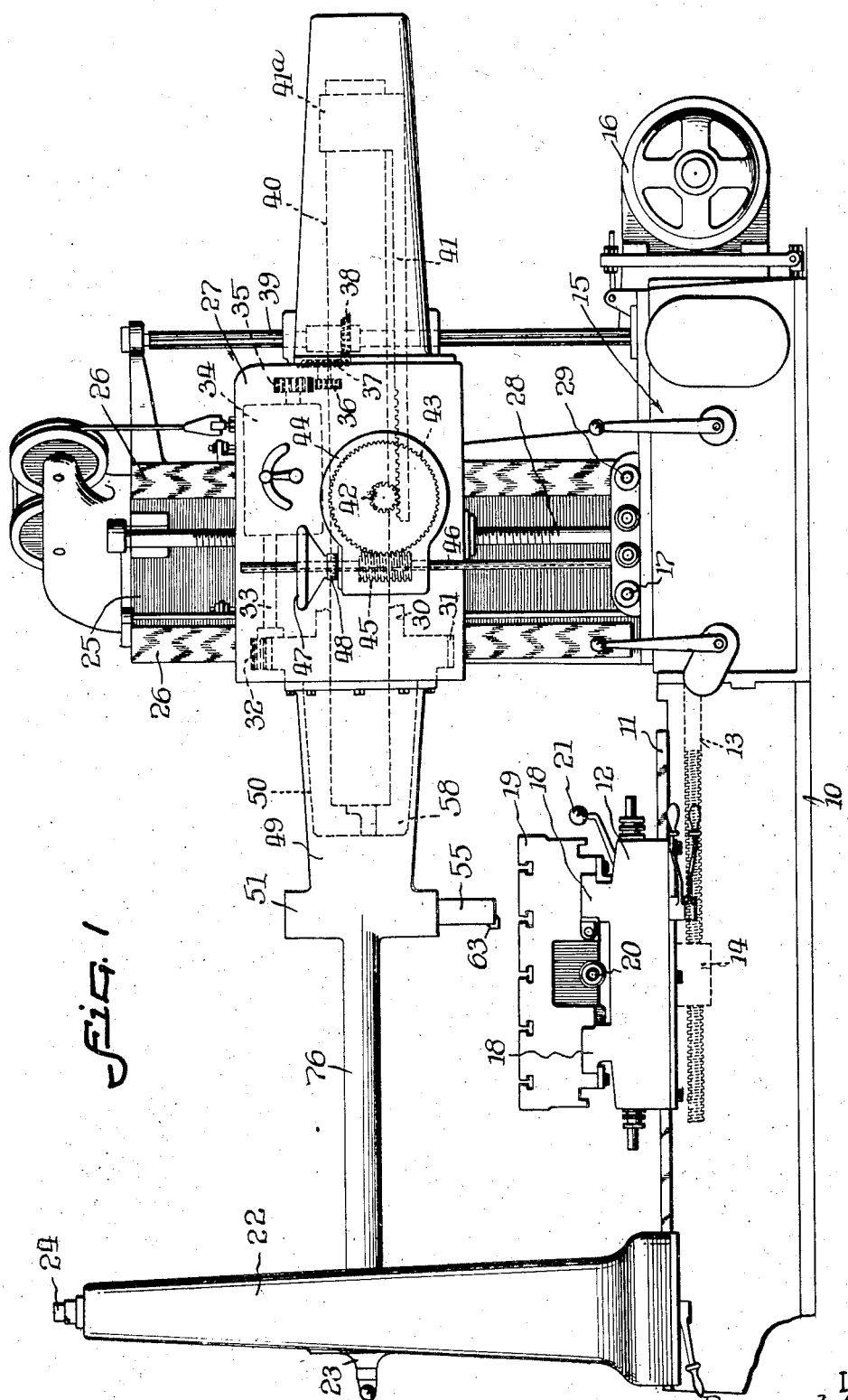

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the invention is illustrated in connection with a horizontal boring, drilling and milling machine. Machines of this type are provided in various forms. In the form selected for purposes of illustration, the machine comprises an elongated horizontal bed 10 formed on the top with suitable ways 11. Slidably mounted on the ways 11 between the ends of the bed 10 is a work saddle 12. Any suitable means may be provided, available at will for traversing the saddle 12 along the bed 10. In the present instance, this means comprises a horizontal feed screw 13 which extends along the interior of the bed 10, and which at one end is in threaded engagement with a fixed nut 14 on the underside of the saddle 12. The other end of the screw 13 is operatively connected through a gear transmission mechanism, indicated generally at 15, to an electric drive motor 16 mounted on the right end of the bed 10. A hand lever 17 is available to control the direction of drive. The details of the transmission mechanism 15 per se constitute no part of the present invention, and hence are not disclosed herein. A suitable mechanism is shown and described in Patent No. 1,858,491, issued May 17, 1932 to Keith F. Gallimore.

The top of the saddle 12 is formed with two parallel horizontal ways 18 extending transversely of the bed 10. A work table 19 is slidably mounted on the ways 18, and is adapted to be traversed by means of a feed screw 20 operable either by hand or from any suitable power source, such as the transmission 15. The direction of the power drive is under the control of a hand lever 21.

Adjustably mounted on the left end of the bed 10 and at one side of the saddle 12 is a tailstock column 22. A tailstock 23 is vertically slidable on the column 22, and is adapted to be traversed by means of a vertical feed screw 24 operable from any suitable power means such as the transmission 15. A headstock column 25 is mounted on the right end of the bed 10 at the other side of the saddle 12, and is formed on its front face with vertical ways 26. Slidably mounted on the ways 26 for vertical adjustment is a tool headstock 27. The latter is supported and adapted to be traversed by means of a vertical feed screw 28 connected at its lower end to the power transmission 15. The screws 24 and 28 are adapted to be driven in synchronism to traverse the tailstock 23 and the headstock 27 at the same speed, and the direction of drive is under the control of a hand lever 29. The details of the connections between the transmission 15 and the feed screws 20, 24 and 28 constitute no part of the present invention, and hence are not disclosed herein. Suitable connections are shown in the above mentioned patent.

Rotatable in the headstock 27 and opening through the left end thereof is a main horizontal spindle member in the form of a sleeve 30. Any suitable means may be provided for driving the sleeve 30, and in the present instance this means is shown as comprising a concentric gear 31 rigid with the sleeve. The gear 31 meshes with a small pinion 32 which is connected through a shaft 33 to a speed-change mechanism 34. The power inlet to the transmission 34 is connected through a train of gears 35, 36 and 37 to a gear 38 slidably splined on a vertically-anchored shaft 39 which extends through the headstock 27, and which is operatively connected at its lower end to the motor 16.

An elongated tool spindle 40 extends through and is splined for axial movement in the sleeve 30. Thus, the sleeve 30 constitutes a drive member for the spindle 40. The left end of the spindle projects from the headstock 27, and has an axial tapered socket 40$^a$. When the machine is used without the attachment, a tool (not shown) may be secured in the socket 40$^a$, and the spindle may be rotated and fed axially.

The means for adjusting the spindle 40 axially, either manually or by power, preferably comprises an elongated parallel gear rack 41 which is anchored at one end by a rotary spline connection 41$^a$ to the inner end of the spindle. The free end of the rack 41 meshes with a pinion 42 rotatable with a large worm wheel 43 in a housing 44 on the front of the headstock 27. Meshing with the worm wheel 43 is a worm 45 axially splined on a vertical shaft 46 extending through the housing 44. The lower end of the shaft 46 is adapted to be connected to the transmission 15 for a power drive. A hand wheel 47 is secured to the upper end of the shaft 46, and affords means for effecting a manual adjustment of the spindle 40. The position of adjustment is indicated by a suitable micrometer 48.

Located externally of the headstock 27, and rigidly but removably secured to the left end of the spindle sleeve 30 for rotation therewith is a housing 49 constituting the body of the boring, facing and tapping tool attachment. While the tool body 49 may be provided in various forms, it is preferably circular in cross-section, and elongated and slightly tapered toward its free end. The base end of the body 49 is hollow to define a chamber 50 into which the outer end of the spindle 40 is adapted to project. A guide bearing 51 in the form of a transverse enlargement is integral with the free outer end of the body 49, and has an opening therethrough constituting a guideway 52. Preferably, the guideway 52 is square in cross-section. Formed in the body 49 is an opening 53 connecting the guideway 52 intermediate its ends to the inner end of the chamber 50, and constituting a guideway extending longitudinally of the spindle 40. One side of the guideway 53 is enlarged as indicated at 54.

Slidably mounted in and extending through the guideway 52 is an elongated tool holder 55, preferably in the form of a bar square in cross-section. To afford means for adjusting the tool holder 55 longitudinally, it is formed along one side intermediate its ends with a longitudinal gear rack 56 which meshes with a pinion 57 journaled in the enlargement 54 of the guideway 53. The pinion 57 in turn meshes with a gear rack 58 slidably bearing against the side of the guideway 53 opposite the enlargement 54, and removably secured to the outer end of the spindle 40 for endwise adjustment therewith. In the present instance, the rack 58 is formed on its inner end with a tapered shank 59 removably inserted in the socket 40$^a$. To accommodate endwise adjustment of the rack 58, the tool holder 55 is formed with an elongated slot 61 in registration with the end of the guideway 53 in all positions of adjustment, and the outer wall of the bearing 51 is formed with a recess 62 in alinement with the passage. It will be evident that the free end of the rack 58, in its outward adjustment may extend through the slot 61 into the recess 62 without interference by the tool holder 55. When the machine is used with the attachment and the gear rack 58 is substituted for the cutting tool otherwise employed, the spindle 40 acts as a longitudinally adjustable ram. By adjusting the spindle 40 longitudinally, it acts through the rack 58, the pinion 57 and the rack 56 to adjust the tool holder 55 transversely of the axis of rotation, thereby making possible the selective use of either end of the tool holder, and adjustment of the circle of revolution.

The tool holder 55 is adapted to support one or more tools at either or both ends depending on the operations that are to be performed. Thus, in Fig. 3, a single cutting tool 63 in the form of a blade is suitably mounted in one end of the tool holder 55. It will be evident that the blade 63 is adapted for either boring or facing depending on whether the cutting edge $a$ or the cutting edge $b$ is utilized. The blade 63 is removably secured in a slot 64, and at its inner end abuts against an adjusting screw 65 threaded in a tapped bore 66. Rotation of the screw 65 serves to adjust the longitudinal position of the blade 63. So that both cutting edges $a$ and $b$ may be used selectively, and will be adjusted simultaneously upon rotation of the screw 65, the edge $a$ radially to vary the circle of revolution and the edge $b$ laterally, the slot 64 is inclined, preferably at approximately 45 degrees, relative to the holder 55, and opens at one corner of the end of the holder.

In Fig. 4, a thread cutting tool 67 is removably secured in one end of the work holder 55. In this instance, the tool 67 has a shank 68 inserted in a bore 69 and secured in position by a set screw 70.

The tool holder 55 shown in Fig. 5 is provided with four tools 71, 72, 73 and 74 located respectively at the four side corners of its two ends, and similar in type and mounting to the tool 63.

In Fig. 6, the tool holder 55 is provided with four tools 71, 72, 73 and 74 as in Fig. 5, but in addition has a radially projecting thread cutting tool 75 similar in type and mounting to the tool 67.

The attachment is adapted for a wide variety of operations, and particularly for performing a series of different operations in an advantageous sequence in one setting up of the work blank. All of the cutting tools for these operations may be secured in one tool holder 55 as shown in Figs. 5 and 6. In this event, it is only necessary to adjust the holder 55 to render the tools selectively available for successive use. On the other hand, where it is inconvenient to mount all of the tools simultaneously or successively in one tool holder 55, different holders, each with certain of the tools, may be substituted.

Utilization of the attachment for performing a succession of different operations is illustrated in Fig. 5 in which the work blank is represented as the fragment of a valve body A having a bore B to be bored and opposite end faces C and D to be machined. Initially, the work blank A and the side cutting edge $b$ of the tool 71 are positioned to take a roughing cut on the face C. To this end, the tool holder 55 is adjusted longitudinally into the position generally shown in full outline, and the work blank A through adjustment of the saddle 12 and the table 19 is positioned axially of the spindle 40 and endwise in operative relation to the tool 71. The tools 72, 73 and 74 are located out of operative range. The spindle 30 now is rotated to revolve the tool 71, and the spindle 40 is slowly fed axially to move the tool gradually outwardly across the face C.

After the roughing cut has been completed, the tool holder 55 is adjusted to position the side cutting edge *b* of the tool 72 in operative relation to the face C as illustrated generally in dotted outline at E. Thereupon, the foregoing operation is repeated to take a finishing cut on the face C. No axial adjustment of the blank A is necessary since the tool 72 projects laterally of the holder 55 beyond the plane of revolution of the tool 71.

The tool holder 55 now is adjusted longitudinally to locate the tool 71 in an intermediate position as illustrated in dotted outline at F to take a roughing cut in the bore B. The edge *a* of the tool 71 projects peripherally beyond the corresponding edge of the tool 73, and the length of the holder 55 with the tools is less than the diameter of the bore B so that interference by the tools 72, 73 and 74 is avoided. With the spindle 40 in rotation, the saddle 12 is fed slowly along the bed 10 to move the tool 71 through the bore B.

After having traversed the bore B in the roughing cut, the tool holder 55 is adjusted longitudinally to position the side cutting edge *b* of the tool 73 in operative relation to the face D as illustrated generally in dotted outline at G. In this adjustment, the tools 71, 72 and 74 are out of cutting range. The spindle 40 is rotated, and the tool 73 is gradually fed outwardly to take a roughing cut on the face D.

The holder 55 now is adjusted to bring the side cutting edge *b* of the tool 74 into operative relation to the face D as illustrated generally in dotted outline at H. The tool 74 projects laterally of the holder 55 beyond the cutting plane of the tool 73, and is revolved and fed radially to take a finishing cut on the face D.

Finally, the holder 55 is adjusted longitudinally into the intermediate position illustrated generally in dotted outline at I, and is rotated, while the blank A is fed axially, to cause the cutting edge *a* of the tool 74, which projects radially beyond the tool 72, to take a finishing cut along the bore B.

During all of the foregoing operations, the work blank A is mounted in fixed position on the table 19. By holding the work blank A against rotation, and revolving the tool, machining operations can be performed on unusually large work pieces.

Fig. 6 illustrates a method of completely machining a gate type valve body in one set up. The body is illustrated in section at J, and has outer end faces K and L and inner side faces M and N to be machined and bores O and P to be tapped. After the bores O and P are tapped, flanged ring seats Q are threaded into same and against the faces M and N. In operation, roughing and finishing cuts are taken on the outer face K as on the face C in Fig. 5. Upon movement of the tool holder 55 through the valve body J, the tool 75 is utilized to thread the bores O and P. During the threading operation, the saddle 12 is fed with a positive thread lead. Thereafter, roughing and finishing cuts are taken on the outer face L. The return movement of the tool holder 55 through the body J is interrupted to take roughing and finishing cuts first on the face N and then on the face M. This completes the machining operation. If, however, it were desired to ream the bore of each of the valve seats Q, the tool 75 would be removed.

The attachment may be provided in various forms. In Fig. 1, the body 49 has an axial extension 76 in the form of a cylindrical bar which is rotatably supported at its outer end in the tailstock 23. Instead of having the extension bar 76, the body 49 may be provided with means for securing various tools or tool fixtures thereto for coaxial rotation. Thus, drills, pressure rollers, groove cutting tools, threading tools, boring and facing tools, etc. may be secured thereto, either directly or through the medium of a coaxial extension spindle. In Fig. 2, a peripheral and end face milling cutter 77 is shown by way of illustration.

I claim as my invention:

1. In a machine tool, in combination, a tool headstock, a spindle journaled in said headstock, a housing fixed for rotation with said spindle, a tool holder slidably mounted in said housing for adjustment transversely of said spindle and projecting laterally from said housing, means in said housing for adjusting said tool holder, means including said spindle and movable longitudinally for actuating said last mentioned means, and means for rotating said spindle.

2. In a machine tool, in combination, a tool headstock, a spindle sleeve journaled in said headstock, a housing secured to said spindle sleeve for rotation therewith, a tool holder slidably mounted in said housing for adjustment transversely of said spindle sleeve and projecting laterally from said housing, means in said housing for adjusting said tool holder, means in said headstock extending longitudinally of said spindle sleeve for actuating said last mentioned means, means for rotating said spindle sleeve, and a rotary cutting tool mounted coaxially on said housing independently of said tool holder for rotation with said housing.

3. In a machine tool, in combination, a tool headstock, a spindle sleeve journaled in said headstock, a housing removably secured to said spindle sleeve for rotation therewith, a tool holder mounted in said housing for adjustment transversely of said spindle sleeve and projecting laterally from said housing, means in said housing for adjusting said tool holder, means extending axially through said spindle sleeve and movable axially thereof for actuating said last mentioned means, and means for rotating said spindle sleeve.

4. In a machine tool, in combination, a horizontal base, an upright column mounted on one end of said base, a tailstock vertically movable on said column, an upright column mounted on the other end of said base, a headstock movable vertically on said last mentioned column, means for adjusting said tailstock and said headstock as a unit on said columns, a work support mounted on said base between said columns, a horizontal spindle member journaled in said headstock, a housing removably connected to said spindle member for rotation therewith, said housing having an axial extension rotatably supported in said tailstock, a tool holder mounted in said housing for adjustment transversely of said spindle member, means for effecting adjustment of said tool holder, and means for rotating said spindle member.

5. In a machine tool, in combination, a horizontal base, an upright column mounted on one end of said base, a tailstock vertically movable on said column, an upright column mounted on the other end of said base, a headstock movable vertically on said last mentioned column, means for adjusting said tailstock and said headstock as a unit on said columns, a work support mounted on said base between said columns, a horizontal spindle member journaled in said headstock, a housing removably connected to one end of said spindle member for rotation therewith, a tool holder mounted in said housing for adjustment transversely of said spindle member, means for effecting adjustment of said tool holder, means for rotating said spindle member, and means for feeding said support axially of said spindle member.

6. In a machine tool, in combination, a horizontal base, an upright column mounted on one end of said base, a tailstock vertically movable on said column, an upright column mounted on the other end of said base, a headstock movable vertically on said last mentioned column, means for adjusting said tailstock and said headstock as a unit on said columns, a work support mounted on said base between said columns, a horizontal spindle member journaled in said headstock, a housing removably secured to one end of said spindle member for rotation therewith, said housing having an axial extension secured in said tailstock, a tool holder mounted in said housing for adjustment transversely of said spindle member, means for effecting adjustment of said tool holder, said last mentioned means including a longitudinally adjustable ram extending axially through said spindle member, means for rotating said spindle member, and means for adjusting said support selectively axially or transversely of said spindle member.

7. In a machine tool, in combination, a base, a vertical column on said base, a headstock adjustable vertically on said column, a horizontal spindle member journaled in said headstock, a housing mounted on said spindle member for rotation therewith, the base end of said housing being formed with a chamber, a ram extending axially though said spindle member, one end of said ram projecting into said chamber and having a socket, said housing being formed with a first guideway extending transversely of said spindle member, and a second guideway extending longitudinally of said spindle member, an elongated tool holder slidably disposed in said first guideway and formed longitudinally with a gear rack, a cutting tool mounted in one end of said holder, a gear journaled in said housing and meshing with said rack, a second gear rack slidably mounted in said second guideway and in mesh with said gear and having a shank secured in said socket, means for rotating said spindle member, and means for adjusting said ram axially.

8. In a machine tool, in combination, a headstock, a spindle member journaled in said headstock, a housing mounted on said spindle member for rotation therewith, a ram extending axially through said spindle member, said housing being formed with a first guideway extending transversely of said spindle member, and a second guideway extending longitudinally of said spindle member, an elongated tool holder slidably disposed in said first mentioned guideway and formed longitudinally with a gear rack, a cutting tool mounted in one end of said holder, a gear journaled in said housing and meshing with said rack, a second gear rack slidably mounted in said second guideway and in mesh with said gear and secured to said ram for axial movement therewith, means for rotating said spindle member, and means for adjusting said ram axially.

9. In a machine tool, in combination, a headstock, a spindle journaled in said headstock, a spindle sleeve on said spindle, a housing removably mounted on one end of said spindle sleeve for rotation therewith, said housing being formed with a guideway extending transversely of said spindle, an elongated tool holder slidably disposed in said guideway and formed longitudinally with a gear rack, a cutting tool mounted in one end of said holder, a gear journaled in said housing and meshing with said rack, means for rotating said spindle sleeve, and means including said spindle for rotating said gear to adjust said tool holder longitudinally.

10. In a machine tool, in combination, a headstock, a spindle member journaled in said headstock, a housing removably mounted on said spindle member for rotation therewith, said housing being formed with a guideway extending transversely of said spindle member, an elongated tool holder slidably disposed in said guideway for adjustment transversely of said spindle member, said tool holder extending completely through said guideway to opposite sides of said housing, a plurality of tools mounted respectively on opposite ends of said tool holder, and means for rotating said spindle member.

11. In a machine tool, in combination, a headstock, a spindle member journaled in said headstock, a housing removably mounted on one end end of said spindle member for rotation therewith, said housing being formed with a guideway extending transversely of said spindle member, an elongated tool holder slidably disposed in said guideway for adjustment transversely of said spindle member, said tool holder extending completely through said guideway to opposite sides of said housing, two tools adjustably mounted respectively on opposite ends of said tool holder and having cutting edges projecting to one side of said tool holder, one cutting edge being disposed laterally of said holder outwardly of the plane of revolution of the other edge, whereby said edges are selectively available upon longitudinal adjustment of said tool holder and without relative axial adjustment between said housing and the work to take successive roughing and finishing cuts respectively, and means for rotating said spindle member.

12. In a machine tool, in combination, a headstock, a spindle member journaled in said headstock, a housing removably mounted on one end of said spindle member for rotation therewith, said housing being formed with a guideway extending transversely of said spindle member, a tool holder mounted for adjustment in said guideway, one end of said tool holder projecting from one side of said housing, two tools adjustably mounted on said one end of said tool holder, one tool having a side cutting edge, the other tool having a peripheral cutting edge extending radially outwardly beyond said one tool, and means for rotating said spindle member.

13. In a machine tool, in combination, a headstock, a spindle member journaled in said headstock, a housing mounted on one end of said spindle member for rotation therewith, said housing being formed with a guideway extending transversely of said spindle member, a tool holder mounted for adjustment in said guideway, one end of said tool holder projecting from one side of said housing, and being formed with an inclined socket opening to one side edge, a tool removably and adjustably secured in said socket, said tool having a side cutting edge and a peripheral cutting edge available respectively for facing and boring, and means for rotating said spindle member.

14. In a machine tool, in combination, a headstock, a spindle member journaled in said headstock, a housing mounted on said spindle member for rotation therewith, said housing being formed with a guideway extending transversely of said spindle member, a tool holder mounted for adjustment in said guideway, one end of said tool holder projecting from one side of said housing, three tools mounted on said end of said tool holder, two of said tools projecting respectively from opposite sides of said tool holder, the other tool projecting from the end of said tool holder beyond said two tools, and means for rotating said spindle member.

15. The method of machining a work blank having a bore and end faces at opposite ends of said bore, said method including first roughing and then finishing one of said end faces, roughing said bore, first roughing and then finishing the other of said end faces, and finishing said bore.

16. For use in a machine tool having a tool spindle, a tool holder rotatable with said spindle, a plurality of tools mounted on said holder eccentrically of said spindle, said tool holder being adjustable transversely of said spindle to render said tools selectively available, and a work support relatively adjustable axially of said spindle, the method of machining a work blank having an opening extending therethrough, external end faces at opposite ends of said opening, two axially aligned internal bores and two opposed internal end faces, said end faces and said bores being coaxial, said method including mounting said blank fixedly on said support with said end faces and said bores in axial alignment with said spindle, roughing and finishing one of said external end faces, tapping said bores, roughing and finishing the other of said external end faces, roughing and finishing one of said internal end faces and roughing and finishing the other of said internal end faces.

17. In a machine tool, in combination, a headstock, a tool spindle journaled in said headstock adapted for longitudinal movement, a driving member nonrotatably connected to said spindle, a housing removably mounted on one end of said driving member for rotation therewith, said housing being formed with a guideway extending transversely of said spindle, an elongated tool holder slidably disposed in said guideway, means responsive to longitudinal movement of said spindle for effecting transverse movement of said tool holder, and means for rotating said spindle.

18. In a machine tool, in combination, a headstock, a tool spindle journaled in said headstock adapted for longitudinal movement and to receive a tool, a driving member nonrotatably connected to said spindle, a housing removably mounted on said driving member for rotation therewith when no tool is in said tool spindle, said housing being formed with a guideway extending transversely of said spindle, an elongated tool holder slidably disposed in said guideway, means insertable in said tool spindle for causing transverse adjustment of said tool holder upon longitudinal movement of said spindle, and means for rotating said spindle.

19. In a machine tool, in combination, a rotatable supporting member formed with a guideway extending transversely of the axis of rotation, means for rotating said member, a tool holder slidably mounted for adjustment along said guideway and projecting at one end from one side of said member, means for adjusting said holder, and two tools mounted on said one end of said holder, one of said tools having a side cutting edge and the other of said tools having a peripheral cutting edge extending radially outwardly beyond said one tool.

20. In a machine tool, in combination, a rotatable supporting member formed with a guideway extending transversely of the axis of rotation, means for rotating said member, a tool holder slidably mounted for adjustment along said guideway and projecting at one end from one side of said member, means for adjusting said holder, and a tool mounted on said holder and having a side cutting edge projecting beyond one side of the holder and having a peripheral cutting edge projecting radially outwardly beyond said one end of said holder, said cutting edges being selectively available respectively for facing and boring.

21. For use in a machine tool having a rotatable drive member, a tool holder rotatable with said member, two tools mounted on said holder eccentrically of the axis of rotation, said holder being adjustable transversely of said axis to render said tools selectively available, and a work support relatively adjustable axially of said member, the method of machining a work blank having a bore and an end face at one end of the bore, said method including mounting the blank on said support with the bore in axial alignment with said member, utilizing said tools successively to rough and finish the end face, and utilizing said tools successively to rough and finish the bore.

22. For use in a machine tool having a rotatable drive member, a tool holder rotatable with said member, two tools mounted on said holder eccentrically of the axis of rotation and projecting different distances laterally from said holder, said holder being adjustable transversely of said axis to render said tools selectively available, and a work support relatively adjustable axially of said member, the method of finishing a work blank having a bore and an end face at one end of said bore, said method including mounting the blank on said support with the bore in axial alignment with said member, relatively adjusting said support axially of said member to position one tool in operative relation to the end face, rotating said member and simultaneously feeding said holder to traverse said one tool across said end face in a roughing cut, adjusting said holder longitudinally to position the other tool in operative relation to the end face while maintaining the relative axial position between said member and said support, and rotating said member and simultaneously feeding said holder to traverse said other tool across the end face in a finishing cut.

23. For use in a machine tool having a rotatable drive member, a tool holder rotatable with said member, two tools mounted on said holder eccentrically of the axis of rotation, said tool holder being adjustable transversely of said axis to render said tools selectively available, and a work support relatively adjustable axially of said member, the method of machining a work blank having a bore, said method including mounting the blank on said support with said bore in axial alignment with said member, adjusting said holder to position one of said tools in operative relation to the surface of the bore, rotating said member and simultaneously effecting a relative axial feeding movement between said member and the blank to rough the bore, adjusting said holder to position the other tool in operative relation to the surface of the bore, and rotating said member and simultaneously effecting a relative axial feed between said member and the blank to finish said bore.

24. The method of machining a work blank having an end face which comprises positioning the blank relative to a revolving tool holder adjustable transversely of the axis of revolution and having radially spaced side cutting edges disposed respectively in different planes of revolution to present said face for cutting engagement with one of said edges, revolving said holder and relatively adjusting said blank and said holder in the plane of said face to feed said one edge across said face in a roughing cut, and revolving said holder and relatively adjusting said blank and said holder in the plane of said face to feed the other of said edges across said face in a finishing cut.

25. In a machine tool, in combination, a rotatable supporting member formed with a guideway extending transversely of the axis of rotation, means for rotating said member, a tool holder mounted for adjustment in said guideway and projecting therefrom, means for adjusting said holder, and two tools mounted on said holder and having cutting edges projecting to one side of said holder, one cutting edge being disposed laterally of said holder outwardly of the plane of revolution of the other of said edges, whereby said edges are selectively available to take roughing and finishing cuts respectively.

RAYMOND M. WOYTYCH.